T. J. DENTZ.
ADJUSTABLE SEAT.
APPLICATION FILED MAY 2, 1907.
910,993.
Patented Jan. 26, 1909.
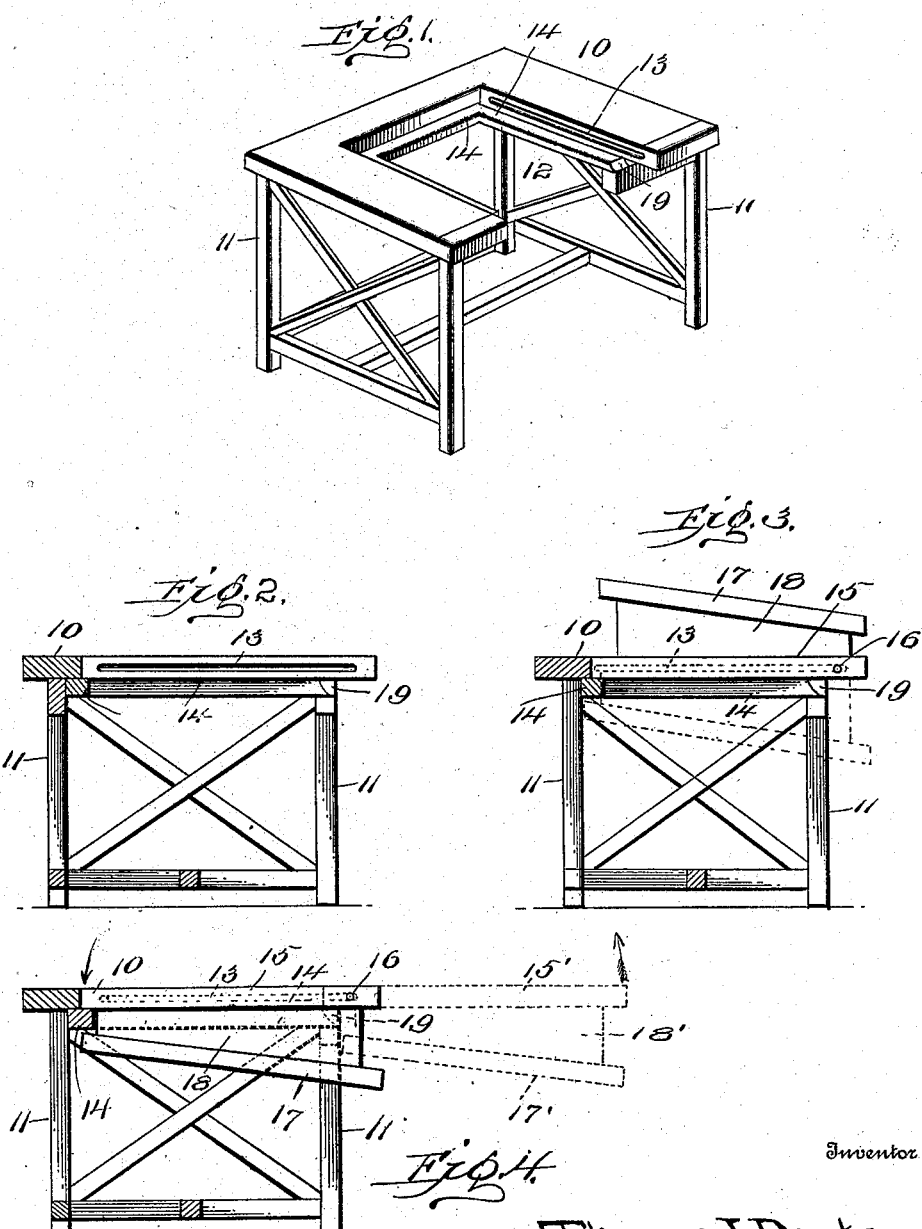

UNITED STATES PATENT OFFICE.

THOMAS J. DENTZ, OF NEW YORK, N. Y.

ADJUSTABLE SEAT.

No. 910,993.  Specification of Letters Patent.  Patented Jan. 26, 1909.

Application filed May 2, 1907. Serial No. 371,464.

*To all whom it may concern:*

Be it known that I, THOMAS J. DENTZ, a citizen of the United States, residing at New York, in the county of New York and State of New York, have invented certain new and useful Improvements in Adjustable Seats; and I do hereby declare the following to be a full, clear, and exact description of the invention, such as will enable others skilled in the art to which it appertains to make and use the same.

This invention relates to seats and has for an object to provide a device of the class embodying a seat proper and with an auxiliary seat of improved structure coöperating with the seat proper.

A further object of the invention is to provide a seat having a substantially plain surface, one portion of which is movable and carrying upon the movable portion a raised or elevated portion whereby the movable portion may be reversed and the elevated portion brought into use.

A further object of the invention is to provide in a seat a substantially plain main seat having a section thereof pivoted and slidable relative to the main seat portion and with an auxiliary raised seat portion carried upon one side of the movable portion and adapted, when turned, to provide a seat raised above the normal level of the main seat.

With these and other objects in view, the invention comprises certain novel constructions, combinations and arrangements of parts, as will be hereinafter fully described and claimed.

In the drawings:—Figure 1 is a view in perspective of a seat made in accordance with the present invention and with the movable portion removed. Fig. 2 is a view in transverse section of the main seat portion with the auxiliary seat portion removed. Fig. 3 is a view in vertical transverse section of the main seat with the auxiliary seat in elevation disposed thereupon and in operative position. Fig. 4 is a similar view illustrating the manner of operating the auxiliary seat.

Like characters of reference designate corresponding parts throughout the several views.

The seat forming the subject-matter of this application while designed to serve as a piano bench or stool in its normal position and as a stool or bench for use of an operator of a self-playing piano or piano player in its inverted position, is as well adapted for a large variety of other purposes, as, for instance, a carriage seat wherein by its employment the usual removable "dickey" seat is dispensed with and the raised seat portion employed in its stead.

The use and operation of the present invention will be described as applied to piano benches and benches for piano players, its use in other respects being fully and clearly understood from such description. It is well known that in operating a mechanical piano or piano player the seat of the operator should be higher than the seat of the operator while playing a piano in the usual and ordinary manner, and it has been heretofore found desirable to employ two benches for the purpose or some means for vertically adjusting the seat of the bench. In the present instance, a bench 10 is provided supported in any approved manner as upon the legs 11 and an opening or recess 12 formed therein. The recess 12 cuts through one side of the seat and thereby produces a plain seat surface bounding three sides of the opening 12. Along opposite sides of the seat member 10 grooves 13 are provided and a ledge 14 secured about the opening 12 and upon the three sides. Within the opening 12 a seat portion 15 is employed which, when in the position shown in full lines in Fig. 4, completes the plain surface of the bench 10, the said seat portion 15 resting upon the flange and provided with studs 16 engaged within the groove 13 upon opposite sides. Upon the plain portion 15 is erected a raised and preferably inclined seat portion 17 with side pieces 18 disposed upon the movable portion 15 and supporting the raised portion 17. Within the outer ends of the ledge 14 a concavity 19 is formed to permit the seat portion 15 to swing upon the pivot 16. When it is desired to use the seat as a raised seat the seat portion 15, as shown in Fig. 4, is drawn outwardly to the prime position and then swung upon the stud 16 as a pivot, and as indicated by the arrows to occupy the position shown in Fig. 3. It will thus be seen that the inclined raised seat portion 17 is attached to the seat portion 10 in such manner that it cannot be accidentally displaced therefrom and that to change the position of the seat portion it is only necessary to swing the seat portion upon its pivot and slide the raised seat portion beneath the normal level portion 10 of the bench.

What I claim is:—

1. In a seat, a substantially plain top provided with a recess and with grooves formed along opposite sides of the recess, a ledge projecting from the inner edges of said recess and terminating a short distance from the ends of the grooves, a reversible seat portion 15, pintles thereon mounted to move, in a horizontal plane, slidably in the grooves, the seat portion substantially flush with the top in either position, with one surface contacting with the surface of the ledge.

2. In a seat, a substantially plain top provided with a rectangular recess and with grooves formed along the opposite sides of the recess, a reversible seat portion, pintles thereon located midway between the upper and lower surfaces of the seat portion, said pintles mounted to move slidably in the grooves, the seat portion substantially flush with the top in either position, a raised seat carried upon the reverse side of the seat portion, and ledges projecting inwardly from the edges of the recess and contacting with one surface of the seat portion while the latter is in its normal or reversed position, said ledges provided with cut-away portions at their outer ends.

In testimony whereof I affix my signature in presence of two witnesses.

THOMAS J. DENTZ.

Witnesses:
LAURENCE R. ATHERTON,
R. C. STEBBINS.